(12) United States Patent
Abu-Mostafa et al.

(10) Patent No.: US 9,953,271 B2
(45) Date of Patent: Apr. 24, 2018

(54) GENERATION OF WEIGHTS IN MACHINE LEARNING

(71) Applicant: CALIFORNIA INSTITUTE OF TECHNOLOGY, Pasadena, CA (US)

(72) Inventors: Yaser Said Abu-Mostafa, Pasadena, CA (US); Carlos Roberto Gonzalez, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 424 days.

(21) Appl. No.: 14/451,870

(22) Filed: Aug. 5, 2014

(65) Prior Publication Data

US 2015/0206066 A1     Jul. 23, 2015

Related U.S. Application Data

(60) Provisional application No. 62/015,176, filed on Jun. 20, 2014, provisional application No. 61/907,491, filed on Nov. 22, 2013.

(51) Int. Cl.
    *G06F 15/18*       (2006.01)
    *G06N 99/00*       (2010.01)
    (Continued)

(52) U.S. Cl.
    CPC ......... *G06N 99/005* (2013.01); *G06K 9/6223* (2013.01); *G06K 9/6256* (2013.01); *G06N 5/025* (2013.01); *G06N 7/005* (2013.01)

(58) Field of Classification Search
None
See application file for complete search history.

(56) References Cited

U.S. PATENT DOCUMENTS 5,819,247 A    10/1998   Freund et al.
6,119,083 A     9/2000   Hollier et al.
                 (Continued)

FOREIGN PATENT DOCUMENTS

EP     1082646 B1    8/2011
EP     2296105 B1   10/2012
        (Continued)

OTHER PUBLICATIONS

Using Hyperbolic Cross Approximation to measure and compensate Covariate Shift—2013 Thomas Vanck vanck@math.tu-berlin.de Institut f ur Mathematik, Technische Universit at Berlin, Berlin Jochen Garcke garcke@ins.uni-bonn.de Institut f ur Numerische Simulation, Universit at Bonn and Fraunhofer SCAI, Sankt Augustin.*

(Continued)

*Primary Examiner* — Luis Sitiriche
*Assistant Examiner* — Ababacar Seck
(74) *Attorney, Agent, or Firm* — Moritt Hock & Hamroff LLP; Steven S. Rubin, Esq.

(57) ABSTRACT

Technologies are generally described for systems, devices and methods relating to determining weights in a machine learning environment. In some examples, a training distribution of training data may be identified, information about a test distribution of test data, and a coordinate of the training data and the test data may be identified. Differences between the test distribution and the training distribution may be determined, for the coordinate. A weight importance parameter may be identified, for the coordinate. A processor may calculate weights based on the differences, and based on the weight importance parameter. The weights may be adapted to cause the training distribution to conform to the test distribution at a degree of conformance. The degree of (Continued)

conformance may be based on the weight importance parameter.

20 Claims, 5 Drawing Sheets

(51) Int. Cl.
  *G06N 5/02* (2006.01)
  *G06K 9/62* (2006.01)
  *G06N 7/00* (2006.01)

(56) References Cited

U.S. PATENT DOCUMENTS

| | | | |
|---|---|---|---|
| 6,373,483 B1* | 4/2002 | Becker | G06T 11/206 345/419 |
| 6,594,586 B1 | 7/2003 | Song et al. | |
| 6,789,069 B1 | 9/2004 | Barnhill et al. | |
| 6,850,873 B1 | 2/2005 | Bax | |
| 6,876,955 B1 | 4/2005 | Fleming et al. | |
| 7,275,018 B2 | 9/2007 | Abu-El-Zeet et al. | |
| 7,379,568 B2 | 5/2008 | Movellan et al. | |
| 7,426,497 B2 | 9/2008 | Baccioiu et al. | |
| 7,561,158 B2 | 7/2009 | Abe et al. | |
| 7,617,164 B2 | 11/2009 | Burges et al. | |
| 7,689,520 B2 | 3/2010 | Burges et al. | |
| 7,720,830 B2 | 5/2010 | Wen et al. | |
| 8,175,384 B1 | 5/2012 | Wang | |
| 8,386,401 B2 | 2/2013 | Virkar et al. | |
| 8,788,439 B2 | 7/2014 | Martinez et al. | |
| 8,798,984 B2 | 8/2014 | Cancedda et al. | |
| 2002/0107842 A1 | 8/2002 | Biebesheimer et al. | |
| 2005/0071301 A1 | 3/2005 | Kuroiwa | |
| 2005/0216426 A1 | 9/2005 | Weston et al. | |
| 2005/0228783 A1 | 10/2005 | Shanahan | |
| 2006/0143254 A1 | 6/2006 | Chen | |
| 2006/0248049 A1 | 11/2006 | Cao et al. | |
| 2007/0094171 A1 | 4/2007 | Burges | |
| 2007/0203908 A1 | 8/2007 | Wang et al. | |
| 2007/0203940 A1 | 8/2007 | Wang et al. | |
| 2007/0223808 A1 | 9/2007 | Kerr | |
| 2008/0169975 A1 | 7/2008 | Yee | |
| 2009/0091443 A1 | 4/2009 | Chen | |
| 2009/0132515 A1 | 5/2009 | Lu et al. | |
| 2010/0169243 A1 | 7/2010 | Su et al. | |
| 2010/0287125 A1 | 11/2010 | Okubo | |
| 2011/0119213 A1* | 5/2011 | Elisseeff | G06F 19/24 706/13 |
| 2012/0078825 A1 | 3/2012 | Kulkarni et al. | |
| 2012/0223889 A1 | 9/2012 | Medlock et al. | |
| 2012/0271821 A1 | 10/2012 | Qin et al. | |
| 2012/0290316 A1 | 11/2012 | Tidhar | |
| 2012/0290319 A1 | 11/2012 | Saria et al. | |
| 2012/0330971 A1 | 12/2012 | Thomas et al. | |
| 2013/0066452 A1 | 3/2013 | Kobayashi et al. | |
| 2013/0118736 A1 | 5/2013 | Usadi | |
| 2013/0238533 A1* | 9/2013 | Virkar | G06N 99/005 706/12 |
| 2013/0254153 A1 | 9/2013 | Marcheret | |
| 2014/0079297 A1 | 3/2014 | Tadayon et al. | |
| 2014/0180738 A1 | 6/2014 | Phillipps et al. | |
| 2014/0180980 A1 | 6/2014 | Hido et al. | |
| 2014/0195466 A1 | 7/2014 | Phillipps et al. | |
| 2014/0201126 A1 | 7/2014 | Zadeh et al. | |
| 2015/0100530 A1* | 4/2015 | Mnih | G06N 3/0454 706/25 |
| 2015/0206065 A1 | 7/2015 | Abu-Mostafa et al. | |
| 2015/0206066 A1 | 7/2015 | Abu-Mostafa et al. | |
| 2015/0206067 A1 | 7/2015 | Abu-Mostafa et al. | |
| 2015/0254573 A1 | 9/2015 | Abu-Mostafa et al. | |
| 2016/0379140 A1 | 12/2016 | Abu-Mostafa et al. | |
| 2017/0011307 A1 | 1/2017 | Abu-Mostafa et al. | |

FOREIGN PATENT DOCUMENTS

| | | |
|---|---|---|
| JP | 2005044330 A | 2/2005 |
| JP | 2010092266 A | 4/2010 |
| WO | 03040949 A1 | 5/2003 |
| WO | 2014151351 A1 | 9/2014 |
| WO | 2015077555 A2 | 5/2015 |
| WO | 2015077557 A1 | 5/2015 |
| WO | 2015077564 A2 | 5/2015 |

OTHER PUBLICATIONS

International Search Report and Written Opinion for application PCT/US15/15669, dated Jun. 3, 2015, 15 pages.
International Search Report and Written Opinion for application PCT/US2014/066808, dated Feb. 24, 2015, 15 pages.
International Search Report and Written Opinion for application PCT/US2014/066805, dated Feb. 19, 2015, 10 pages.
"AdaBoost", AdaBoost—Wikipedia, the free encyclopedia, accessed at http://en.wikipedia.org/wiki/AdaBoost, Last modified on Mar. 26, 2014, 8 Pages.
"Machine learning: Boosting," accessed at http://math.bu.edu/people/mkon/MA751/L17Boosting.pdf, accessed on Jun. 16, 2014, pp. 41.
Bickel, S., et al., "Discriminative Learning under covariate shift," The Journal of Machine Learning Research, 2009, pp. 2137-2155, vol. 10.
Bickel, S., et al., "Discriminative Learning for Differing Training and Test Distributions," In Proceedings of the 24th international conference on Machine learning, 2007, pp. 81-88.
Cao, B., et al., "Distance Metric Learning under Covariate Shift," Proceedings of the Twenty-Second International Joint Conference on Artificial Intelligence, 2011, pp. 1204-1210.
Chen, T., et al., "Feature-Based Matrix Factorization," 2011, pp. 10.
Cortes, C., et al., "Sample Selection Bias Correction Theory," In Algorithmic Learning Theory, 2008, pp. 38-53.
Cortes, C., et al., "Learning Bounds for Importance Weighting," Advances in Neural Information Processing Systems, 2010, pp. 442-450.
Hanczar, B. and Dougherty, E., "The reliability of estimated confidence intervals for classification error rates when only a single sample is available," Pattern Recognition, 2013, pp. 1067-1077, vol. 46.
Huang, J., et al., "Correcting Sample Selection Bias by Unlabeled Data," Proceedings of the 2006 Conference Advances in Neural Information processing systems, 2007, pp. 601-608, vol. 19.
Kohavi, R., et al., "The Utility of Feature Weighting in Nearest-Neighbor Algorithms," Proceedings of the Ninth European Conference on Machine Learning, 1997, pp. 10.
Koren, Y., "Factorization meets the neighborhood: a multifaceted collaborative filtering model," In Proceedings of the 14th ACM SIGKDD international conference on Knowledge discovery and data mining, 2008, pp. 426-434, ACM.
Rajan, S., "A Large-Scale Active Learning System for Topical Categorization on the Web," Proceedings of the 19th international conference on World wide web, 2010, pp. 791-800.
Ren, J., et al., "Type Independent Correction of Sample Selection Bias via Structural Discovery and Re-balancing," In Proceedings of the Eighth SIAM International Conference on Data Mining, 2008, pp. 565-576.
Rosset, S., et al., "A Method for Inferring Label Sampling Mechanisms in Semi-Supervised Learning," Advances in Neural Information Processing Systems 17, 2005, pp. 8.
Shimodaira, H., "Improving predictive inference under covariate shift by weighting the log-likelihood function," Journal of Statistical Planning and Inference, 200, pp. 227-244, vol. 90.
Sugiyama, M., "Direct Importance Estimation with Model Selection and Its Application to Covariate Shift Adaptation," Advances in neural information processing systems, 2008, pp. 1433-1440.
Tsianos, K. I., et al., "Push-Sum Distributed Dual Averaging for Convex Optimization," In proceeding of IEEE Conference on Decision and Control, 2012, pp. 5453-5458.

(56) References Cited

OTHER PUBLICATIONS

Zadrozny, B., "Learning and Evaluating Classifiers under Sample Selection Bias," In Proceedings of the 21st international conference on Machine learning, 2004, pp. 1-8.

Zadrozny, B., et al., "Cost-Sensitive Learning by Cost-Proportionate Example Weighting," Proceedings of the Third IEEE International Conference on Data Mining, 2003, pp. 435-442.

"Machine learning," accessed at https://web.archive.org/web/20141117095534/http://en.wikipedia.org/wiki/Machine_learning, last modified on Nov. 16, 2014, pp. 13.

Bickel, S., et al., "Discriminative Learning for Differing Training and Test Distributions," Proceedings of the 24th International Conference on Machine Learning, pp. 1-8 (Jul. 24, 2007).

Bickel, S., et al., "Learning under Differing Training and Test Distributions," Dissertation, Universitat Potsdam, pp. 110 (Jul. 22, 2009).

Chiu., H. P., et al., "Learning to generate novel views of objects for class recognition," Computer Vision and Image Understanding, vol. 113, pp. 1183-1197 (2009).

Guo.,Y., and Schuurmans, D., "A Reformulation of Support Vector Machines for General Confidence Functions," Advances in Machine Learning, pp. 109-119 (Nov. 2009).

Hachiya., H., et al., "Importance-Weighted Least-Squares Probabilistic Classifier for Covariate Shift Adaptation with Application to Human Activity Recognition," Neurocomputing, vol. 80, pp. 93-101 (Mar. 15, 2012).

Sakurada, R., et al.,"Stock Return Prediction using Messages of the Internet Forum," Department of Computer Science and Engineering. Toyohashi Univmily of Technology, pp. 1-6 (May 31, 2013).

Sugiyama, M., et al., "Supervised Learning under Non-Stationarity: when input distribution of data changes," Japan Indutrial Publishing Co., Ltd,vol. 18, No. 10, pp. 1-9 (Oct. 1, 2007).

Babenko, B., "Note: A Derivation of Discrete AdaBoost", Department of Computer Science and Engineering, University of California, San Diego, available at https://web.archive.org/web/20110717111635/http://vision.ucsd.edu/~bbabenko/data/boosting_note.pdf, Jul. 17, 2011, pp. 3.

Bylander, T. and Tate, L. "Using Validation Sets to Avoid Overfitting in AdaBoost," Department of Computer Science, University of Texas at San Antonio, pp. 544-549 (2006).

Extended european search Search Report for Appliaction No. 16172168.3, dated Nov. 25, 2016, pp. 12.

Gonzalez, C, R., "Optimal Data Distributions in Machine Learning", California Institute of Technology , pp. 125 (May 22, 2015).

González, C.R., and Abu-Mostafa, Y.S., "Four Results in Matching Data Distributions," pp. 1-18 (Jun. 21, 2014).

González, C.R., and Abu-Mostafa, Y.S., "Mismatched Training and Test Distributions Can Outperform Matched Ones," Neural Computation, vol. 27, No. 2, pp. 365-387 (Feb. 2015).

Kalai, A.T. et al.,"Boosting in the presence of noise" Proceedings of the thirty-fifth annual ACM symposium on Theory of computing, pp. 10 (Jun. 9, 2013).

Liu, F., et al., "A Robust Support Vector Data Description Classifier," Proceedings of the 32nd Chinese Control Conference, pp. 3781-3784, (Jul. 26-28, 2013).

Mason, L., et al., "Boosting Algorithms as Gradient Descent," Advances in Neural Information Processing Systems, vol. 12, pp. 512-518 (1999).

Mehrotra, K., et al., "Fault tolerance of Neural Networks," Final Technical Report, RL-TR-94-93, Syracuse University, pp. 107 (Jul. 1994).

Rockafellar, R.T., "Basic Issues in Lagrangian Optimization," Department of Applied Mathematics University of Washington FS-20 Seattle, WA 98195, USA, pp. 25 (1993).

Silva, L, M., et al., "Data classification with multilayer perceptrons using a generalized error function," Neural Networks, vol. 21, Issue 9, pp. 1302-1310 (Nov. 2008).

Sugiyama, M., et al., "Covariate Shift Adaptation by Importance Weighted Cross Validation," Journal of Machine Learning Research, vol. 8, pp. 985-1005 (2007).

"Cross-validation (statistics)," Wikipedia, accessed at https://web.archive.org/web/20131115062828/https://en.wikipedia.org/wiki/Cross-validation_(statistics), modified on Nov. 14, 2013, pp. 6.

Extended European Search Report for Application No. 14864007.1, dated Jul. 6, 2017, pp. 15.

Extended European Search Report for Application No. 14864908.0, dated Jul. 5, 2017, pp. 5.

Extended European Search Report for Application No. 15761177.3, dated Aug. 30, 2017, pp. 10.

Gretton, A., et al., "Covariate Shift by Kernel Mean Matching," in Dataset Shift in Machine Learning, Chapter 8, pp. 131-160, Quinonero-Candela, J., et al., eds., MIT Press (Dec. 12, 2008).

\* cited by examiner

GENERATION OF WEIGHTS IN MACHINE LEARNING

CROSS-REFERENCE TO RELATED APPLICATIONS

This application is related to U.S. application Ser. No. 15/261,390 entitled "WEIGHT BENEFIT EVALUATOR FOR TRAINING DATA," U.S. application Ser. No. 14/451,899 entitled "WEIGHT GENERATION IN MACHINE LEARNING," and U.S. application Ser. No. 14/451,935 entitled "ALTERNATIVE TRAINING DISTRIBUTION DATA IN MACHINE LEARNING."

This application claims priority under 35 U.S.C. § 119(e) to U.S. Provisional Application Ser. No. 62/015,176 filed on Jun. 20, 2014 and U.S. Provisional Application Ser. No. 61/907,491 filed on Nov. 22, 2013, the entirety of both of these applications is hereby incorporated by reference.

BACKGROUND

Unless otherwise indicated herein, the materials described in this section are not prior art to the claims in this application and are not admitted to be prior art by inclusion in this section.

Machine learning may involve systems that may be trained with data in order to learn from the data and make generalizations based on the data. A trained machine learning system may take inputs and predict outputs. In some examples, machine learning techniques may predict outputs by solving a classification or regression problem. Machine learning systems may be effective to classify data, make recommendations, and/or predict various outcomes based on training a learning algorithm with data.

SUMMARY

In some examples, methods to determine weights in a machine learning environment are generally described. In some examples, the methods may include identifying, by a processor, a training distribution of a training data. In other examples, the methods may also include identifying, by the processor, information about a test distribution of a test data. In some other examples, the methods may also include identifying, by the processor, a coordinate of the training data and the test data. In still other examples, the methods may also include determining, by the processor, for the coordinate, differences between the test distribution and the training distribution. In other examples, the methods may also include identifying, by the processor, a weight importance parameter for the coordinate. In some other examples, the methods may also include calculating, by the processor, weights based on the differences and based on the weight importance parameter. The weights may be adapted to cause the training distribution to conform to the test distribution at a degree of conformance. In some examples, the degree of conformance may be based on the weight importance parameter.

In some examples, methods to determine weights in a machine learning environment are generally described. In some examples, the methods may include identifying, by a processor, a training distribution of a training data. In still other examples, the methods may also include identifying, by the processor, information about a test distribution of a test data. In various examples, the methods may also include identifying, by the processor, a coordinate of the training data and the test data. In some other examples, the methods may also include determining, by the processor, for the coordinate, differences between the test distribution and the training distribution. In other examples, the methods may include identifying, by the processor, a first weight importance parameter for the coordinate. In still other examples the methods may also include calculating, by the processor, first weights based on the differences and based on the first weight importance parameter. The first weights may be adapted to cause the training distribution to conform to the test distribution at a first degree of conformance. In some examples, the first degree of conformance may be based on the first weight importance parameter. In various other examples, the methods may also include identifying, by the processor, a second weight importance parameter for the coordinate. In some other examples, the methods may also include calculating, by the processor, second weights based on the differences and based on the second weight importance parameter. The second weights may be adapted to cause the training distribution to conform to the test distribution at a second degree of conformance. In some examples, the second degree of conformance may be based on the second weight importance parameter. In various examples, the second degree of conformance may be different from the first degree of conformance.

In some other examples, machine learning systems are generally described. In some examples, the machine learning systems may include a processor and/or a memory configured to be in communication with the processor. In some examples, the memory may include training data. The training data may include first points. In some other examples, the memory may include test data. The test data may include second points. In some examples, the processor may be effective to identify a coordinate of the first and second points. The coordinate may include a range of values in a coordinate space. In some other examples, the processor may be effective to divide the range of values in the coordinate space into bins. Respective bins may define subsets of the range of values. In various other examples, the processor may be effective to determine a first frequency. The first frequency may relate to a first percentage of the first points which may be located within a particular bin. In some other examples, the processor may be effective to determine a second frequency. The second frequency may relate to a second percentage of the second points which may be located within the particular bin. In some other examples, the processor may be effective to identify a weight importance parameter for the coordinate. In other examples, the processor may be effective to compare the first frequency and the second frequency. In other examples, the processor may be effective to calculate the weight for the training data, based at least in part on the comparison of the first and second frequencies, and based on the weight importance parameter. The weight may be adapted to cause the training data to conform to the test data at a degree of conformance. The degree of conformance may be based on the weight importance parameter. In some other examples, the memory may be effective to store the weight.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to weight generation in machine learning.

Briefly stated, technologies are generally described for systems, devices and methods relating to determining weights in a machine learning environment. A training distribution of training data may be identified. For example, training data may include points, such as inputs and outputs, which may be used to learn a function. Information about a test distribution of test data may be identified. In some examples, test data may be data for input into a machine learning function. A coordinate of the training data and the test data may be identified. The coordinate may be, for example, a number of movies rated by users. Differences between the test distribution and the training distribution may be determined, for the coordinate. For example, the difference may relate to the popularity of a movie. A weight importance parameter may be identified, for the coordinate. A processor may calculate weights based on the differences, and based on the weight importance parameter. The weight importance parameter may relate to how much the training distribution should conform to the test distribution. The weights may be adapted to cause the training distribution to conform to the test distribution at a degree of conformance. The degree of conformance may be based on the weight importance parameter.

Figure 1:
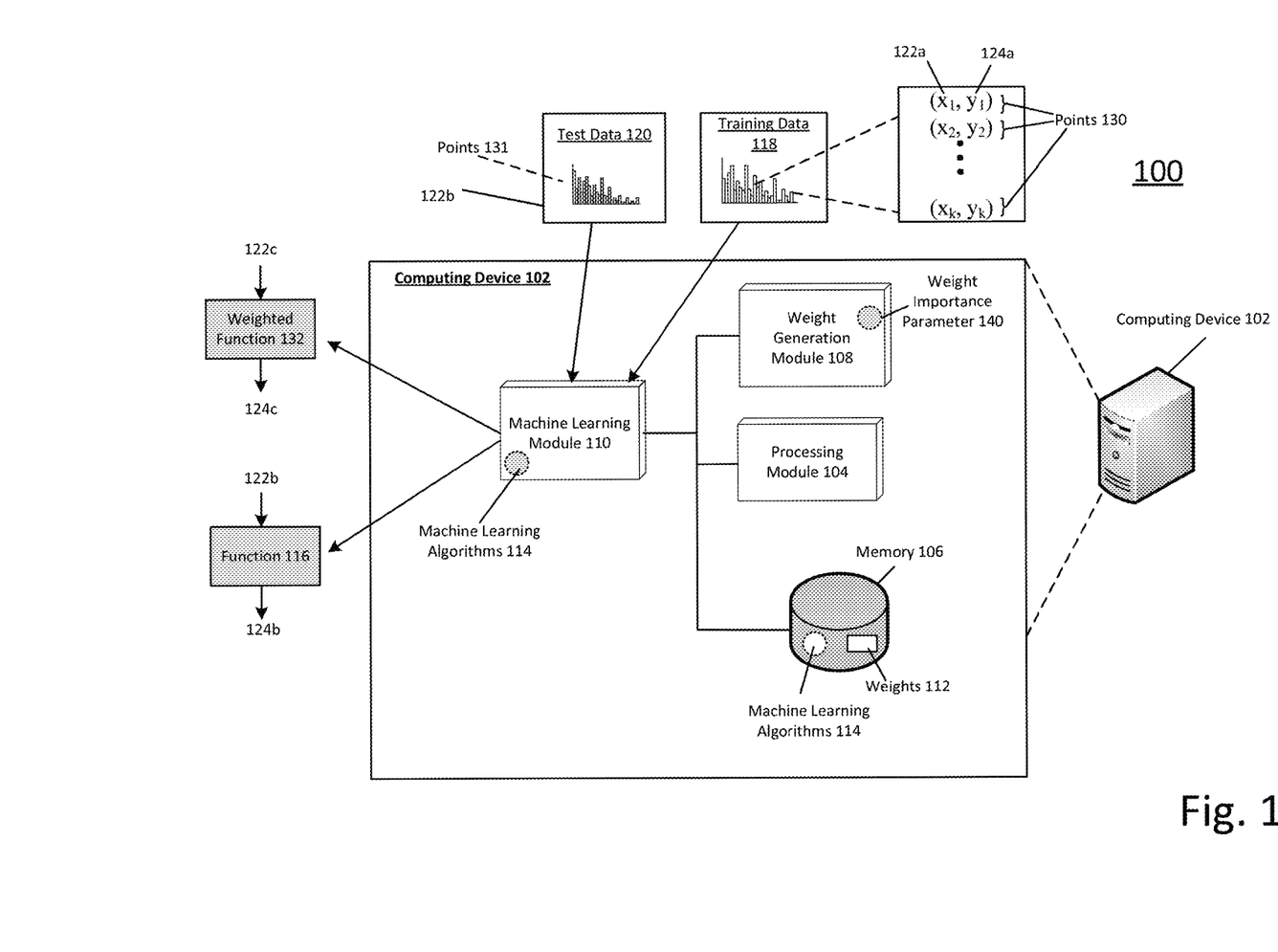
FIG. 1 illustrates an example system that can be utilized to implement weight generation in machine learning.

FIG. 1 illustrates an example system 100 that can be utilized to implement weight generation in machine learning, arranged according to at least some embodiments described herein. As depicted, system 100 may include a computing device 102. Computing device 102 may include a processing module 104, a memory 106, a weight generation module 108, and a machine learning module 110, all configured to be in communication with one another. Processing module 104 may be hardware and may be configured to execute one or more instructions. For example, processing module 104 may be configured to execute one or more instructions stored in memory 106. Memory 106 may be further effective to store one or more machine learning algorithms 114. Machine learning algorithms 114 may include instructions and/or sets of instructions effective to produce a function 116 when executed by machine learning module 110.

As will be discussed in further detail below, machine learning module 110 may be effective to use one or more machine learning algorithms 114 and training data 118 to learn or train function 116. An example of function 116 may be a function to determine a credit score. In some examples, training data 118 may include one or more points 130. Points 130 may include sets of associated inputs 122a and outputs 124a. For example, an input with an income X and debt Y may result in a credit score Z. In some examples, a training distribution of training data 118 may be identified by processing module 104. In various other examples, processing module 104 may be effective to identify points 130 of training data 118. Training data 118 may be stored in memory 106. Points 130 of training data 118 may follow a particular training distribution. For example, the training distribution may indicate a range of income levels at a first instance of time. In some examples, the training distribution may be a probability distribution. Training data 118 may be generated at an instance in time which may be prior to generation of function 116. In some examples, function 116 may be effective to determine outputs 124b (such as, for example, determinations, classifications, predictions, and/or recommendations) based on inputs 122b of test data 120 provided to function 116. In some examples, outputs 124b may be referred to as "labels."

For example, the test distribution may indicate a range of income levels at a second instance of time. Test data 120 may include a number of points 131 which may follow a particular test distribution. In some examples, test data 120 may be generated at an instance in time which is later than the instance in time at which training data 118 is generated. In some examples, the test distribution may be a probability distribution. The test distribution of test data 120 may be different from the training distribution of training data 118. In some examples, some information may be known about the test distribution of test data 120 prior to the input of test data 120 into function 116. For example, publicly available information such as census data may be accessed to identify changes in income or population between training and test data. In an example, processing module 104 may be configured to identify information about the test distribution of test data 120. In some examples, information about a test distribution may include statistics such as a mean and/or standard deviation of the test distribution. In some other examples, information about the test distribution may include estimations of projections of the test distribution. For example, histograms of points 131 along a coordinate may result in an estimate of the projection of the test distribution along the coordinate. Test data 120 and/or information about test data 120 may be stored in memory 106. Weight generation module 108 may be effective to determine and/or calculate weights 112 for each point 130 of training data 118. Weights 112 may be applied to points 130 of training data 118 such that, after application of weights 112, points 130 of training data 118 may follow a probability distribution that resembles, matches, and/or conforms to the probability distribution of test data 120 at a degree of conformance. A weight importance parameter 140 may be adjusted to control the degree to which weights may be used to match and/or conform points 130 of training data 118 to points of test data 120. Weight importance parameter 140 may be adjusted by a user of computing device 102 or by machine learning module 110. In some examples, processing module 104 may be configured to identify weight importance parameter 140.

Machine learning module 110 may receive weights 112 from weight generation module 108. Machine learning algorithms 114 may use weights 112 and/or training data 118 to produce a weighted function 132. Weighted function 132 may be effective to determine and/or generate outputs or labels 124c (such as, for example, determinations, classifications, predictions, and/or recommendations) based on the application of inputs 122c to weighted function 132. In some examples, some labels generated by weighted function 132 may be different from labels generated by function 116, even where the same input values are applied to function 116 and weighted function 132.

Figure 2:
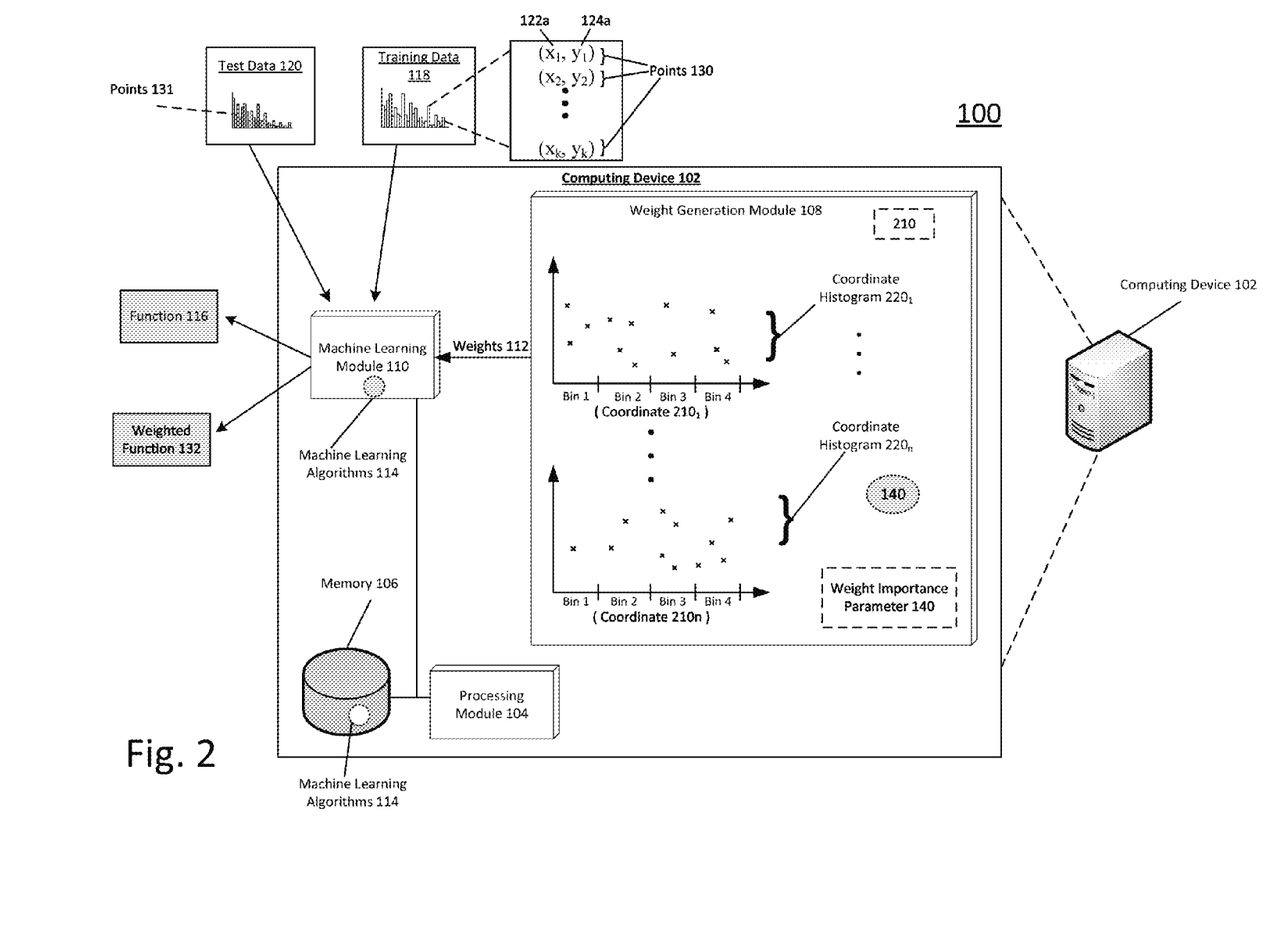
FIG. 2 depicts the example system of FIG. 1 with additional details related to a weight generation module.

FIG. 2 depicts example system 100 of FIG. 1 with additional details related to weight generation in machine learning, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity and brevity.

In some examples, as is explained in more detail below, weight generation module 108 may receive training data 118 and test data 120 from memory 106, or from another source. Weight generation module 108 may identify a training distribution of training data 118. Weight generation module 108 may identify information about a test distribution of test data 120. Weight generation module 108 may identify and/or choose one or more coordinates 210 (including, e.g., $210_1$ . . . $210_n$) shared by the training distribution and the test distribution. Coordinates 210 may include, for example, one or more parameters or dimensions of points 130. Each of coordinates 210 may include a range of values in a coordinate space. A coordinate space may be, for example, a Euclidean or other geometric space for a particular coordinate 210. For example, if machine learning module 110 relates to generation of a credit score, coordinates 210 may relate to income, debt, etc. Weight generation module 108 may divide the range of values of each coordinate space into one or more bins. Respective bins may define subsets of the range of values for each coordinate. For example, weight generation module 108 may divide each identified and/or chosen coordinate 210 into one or more bins (such as, for example, "Bin 1", "Bin 2", "Bin 3", etc.).

In further summarizing the detailed discussion below, weight generation module 108 may determine respective values for points 130 along each identified coordinate 210. Weight generation module 108 may determine frequencies of a number of points 130, 131 located within respective bins, for respective coordinates 210. A frequency may be, for example, a percentage of points 130 located within a particular bin, relative to the total number of points 130, for a particular coordinate 210. Weights 112 may be calculated for each point 130 of training data 118, based on the frequency of points 130 located in each bin, for each coordinate, based on information about points in test data 120, and based on weight importance parameter 140. In an example, weight importance parameter 140 may be adjusted to control the degree to which weights 112 may be effective to match and/or conform points 130 of training data 118 to points of test data 120. Machine learning module 110 may produce weighted function 132 based on weights 112, weight importance parameters 140, and/or training data 118.

Inputs 122a of training data 118 may be vectors including one or more parameters. In an example where machine learning algorithms 114 are designed to recommend movies to a user, some example parameters of inputs 122a may include an age of the user, an annual salary, a number of movies rated by the user, a location where the user lives, etc. Weight generation module 108 may choose one or more of the parameters as coordinates 210 (including coordinates $210_1, 210_2, \ldots, 210_n$). Weight generation module 108 may be effective to evaluate points 130 by examining each point 130 on a coordinate-by-coordinate basis. Each coordinate 210 may be divided into a number of bins (such as "Bin 1", "Bin 2", "Bin 3", etc.). In an example where the chosen coordinate 210 is annual salary, Bin 1 may range from $0-$25,000, Bin 2 may range from $25,000-$50,000, Bin 3 may range from $50,000-$75,000, etc. Each point 130 may include a parameter related to annual salary. A location of each point 130 may be determined along the annual salary coordinate 210. For example, a first point 130 may include an annual salary parameter value of $42,000. Accordingly, the first point 130 may be located in Bin 2. The number of points 130 located within each bin may be determined by weight generation module 108 and may be divided by the total number of points 130 to produce a frequency for each bin. As will be described in further detail below, weights 112 may be determined and/or calculated based on weight importance parameter 140. In some other examples, a determination and/or calculation of weights 112 may be further based on differences between frequencies calculated for the test distribution and frequencies calculated for the training distribution.

Weight generation module 108 may generate weights 112 using equation (1):

$$\omega_i = 1 + \Sigma_{c=1}^{C} \lambda_c \mu_c(\theta_c(i)) \text{ for } i \in R \tag{1}$$

where $\omega_i$ may be a weight 112 for a particular point i among points 130. $\mu_c$ may quantify a difference between frequencies of points 131 in test data 120, in a particular bin (such as, for example, "Bin 1", "Bin 2", "Bin 3", and/or "Bin 4"), and the weighted frequency of points 130 in training data 118, in the particular bin, multiplied by a factor involving weight importance parameter 140 for the particular coordinate c. In some examples, $\mu_c$ may be calculated for each coordinate c (of coordinates 210). C may represent the total number of coordinates 210. $\theta_c$ may be a function that may determine in which bin a particular point i, of points 130, falls. $\lambda_c$ may represent weight importance parameter 140. $\lambda_c$ may be adjusted to control the degree to which weights 112 may be effective to match and/or conform the training distribution to the test distribution.

Weight generation module 108 may determine the values for $\mu_c$ using equation (2):

$$\mu_c(t) = \frac{N_R}{N_R + \lambda_c n_c(t)} \left( v_c(t) - \frac{1}{N_R} \sum_{\substack{i \in R \\ \theta_c(i)}} \left( 1 + \sum_{\substack{m=1 \\ c \neq m}}^{C} \lambda_m \mu_m(\theta_m(i)) \right) \right) \tag{2}$$

where $n_c$ may be a vector which may hold a current count value which may represent the number of points in training data 118 in each of the bins, of a particular coordinate C, among coordinates 210. $N_R$ may represent the number of points 130 in training data 118. $v_c$ may represent a frequency of points in test data 120 appearing in a particular bin (such as, for example, "Bin 1", "Bin 2", "Bin 3", and/or "Bin 4"), for a particular coordinate C among coordinates 210, relative to the total number of points 130. $\lambda_c$ may represent weight importance parameter 140. Weight generation module 108 may use values of $\mu_c$ with equation (1) to determine and/or calculate weights 112.

An iterative process may be used by weight generation module 108 to determine $\mu_c$. In some examples, all $\mu_c$ may be initialized to zero or some other value. A first comparison value $\mu_c(t)$ may be identified for each bin of each coordinate using equation (2). The computed value of $\mu_c(t)$ may be plugged into equation (2) iteratively, to produce difference values. A value of $\mu_c(t)$ may be iteratively updated until a convergent value of $\mu_c(t)$ is reached. The convergent value of $\mu_c(t)$ may be used in equation (1) to produce weights 112 for each point 130 of training data 118. In some examples, values of $\mu_c(t)$ used while iterating equation (2) may be based on fractions of differences of values used in the previous iteration according to equation (3):

$$\mu'_{new} = \alpha * \mu_{new} + (1-\alpha) * \mu_{old} \qquad (3)$$

with $\alpha=0.1$ or $\alpha=0.01$ where $\mu_{old}$ may be the value of $\mu$ used during a previous iteration of equation (2) to old compute $\mu_{new}$. Equation (3) may use $\mu_{new}$, and $\mu_{old}$ to calculate $\mu'_{new}$, which may be used in subsequent iterations of equation (2). $\alpha$ may be a variable used to control a degree to which new values of $\mu$ (e.g., $\mu'_{new}$) depend upon previous values of $\mu$ (e.g., $\mu_{old}$), when iterating equation (2).

Among other potential benefits, weight generation in machine learning arranged in accordance with the present disclosure may allow for simplified matching of test and training distributions to improve the predictive capability of machine learning systems. A weight importance parameter may affect the degree to which weights serve to conform the training distribution to a test distribution. Additionally, the weight importance parameter may be adjusted such that there is a net positive gain between the benefit of matching distributions and the detriment of sample loss that may be present in matching the training and test distributions. Further, by choosing a number of bins on a coordinate-by-coordinate basis, weight generation in machine learning in accordance with the present disclosure may account for differences between training data sets and test data sets which result from the effects of a finite sample size Changes may be identified between training data and test data which may occur over time as a result of changing opinions, trends, fashions, etc. In some examples, taking such changes into account may result in machine learning systems with better predictive ability. Recommendation systems, or predictions of time series like the stock market, may benefit from the described system. Different weight importance parameters may be identified for different coordinates. For example, a weight importance parameter of the coordinate "salary" may be assigned a weight so that distributions conform more than a weight importance parameter of the coordinate "age".

Figure 3:
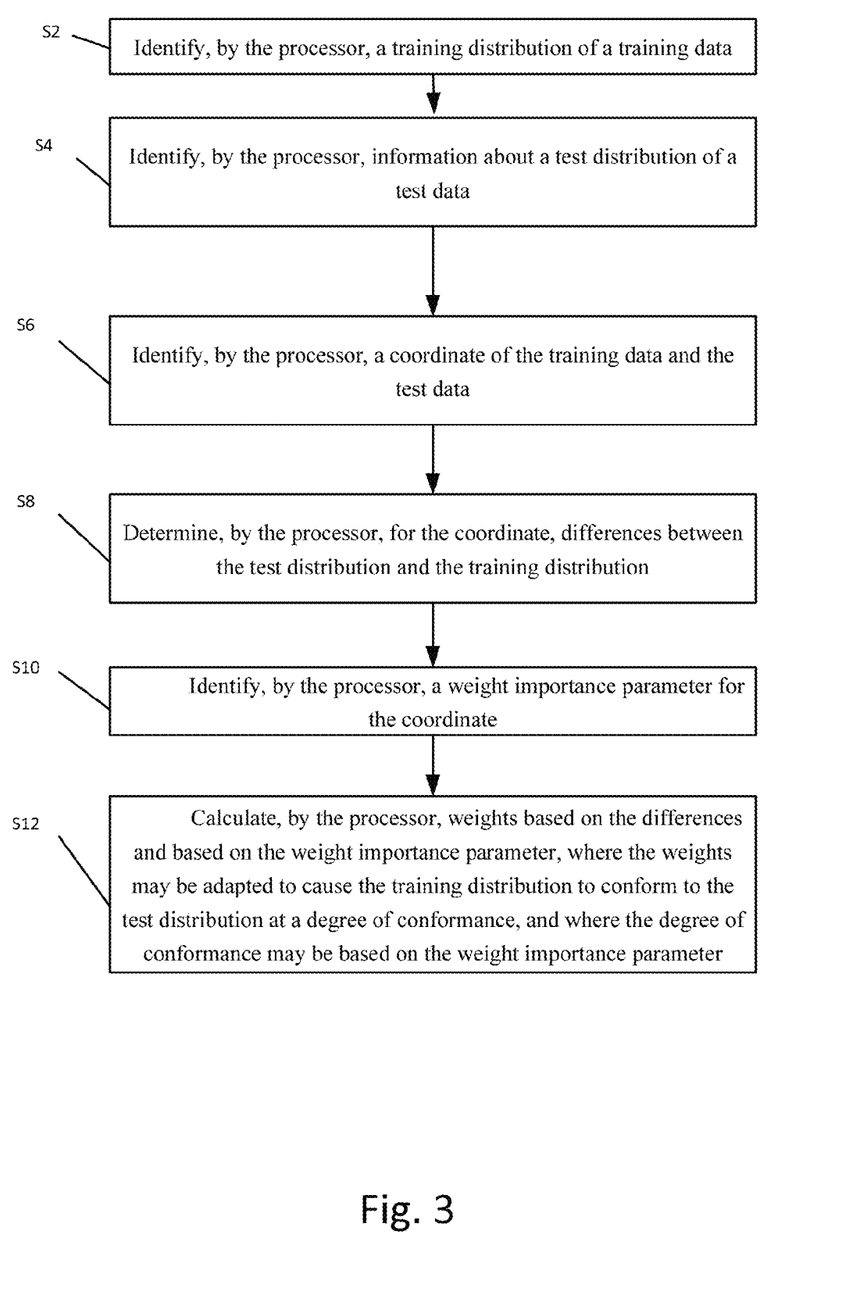
FIG. 3 depicts a flow diagram for an example process to implement weight generation in machine learning.

FIG. 3 depicts a flow diagram for example process to implement weight generation in machine learning, arranged in accordance with at least some embodiments described herein. In some examples, the process in FIG. 3 could be implemented using system 100 discussed above and could be used to generate weights for machine learning. An example process may include one or more operations, actions, or functions as illustrated by one or more of blocks S2, S4, S6, S8, S10 and/or S12, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 3 may be used by a processor, such as processing module 104, or by a machine learning module, such as machine learning module 110, as described above.

Processing may begin at block S2 "Identify, by the processor, a training distribution of a training data." At block S2, the processor may identify a training distribution of training data.

Processing may continue from block S2 to block S4, "Identify, by the processor, information about a test distribution of a test data." At block S4, the processor may identify information about a test distribution of the test data. In an example, the training data may be generated at a first instance in time and the test data may be generated at a second instance in time. The second instance in time may be later than the first instance in time.

Processing may continue from block S4 to block S6, "Identify, by the processor, a coordinate of the training data and the test data." At block S6, the processor may identify a coordinate of the training data and the test data. In some examples, a range of values in coordinate spaces may be divided into a number of bins. For example, a coordinate 210 may be divided into one or more bins, such as "Bin 1", "Bin 2", "Bin 3", etc., as depicted in FIG. 2.

Processing may continue from block S6 to block S8, "Determine, by the processor, for the coordinate, differences between the test distribution and the training distribution." At block S8, differences between the test distribution and the training distribution may be identified. Differences may be iteratively determined, and weights may be calculated based on a convergent value of the differences between the training and test data. For example, differences between the test distribution and the training distribution may be iteratively determined using equation (2), discussed above.

Processing may continue from block S8 to block S10, "Identify, by the processor, a weight importance parameter for the coordinate." At block S10, a weight importance parameter, such as weight importance parameter 140, may be identified.

Processing may continue from block S10 to block S12, "Calculate, by the processor, weights based on the differences and based on the weight importance parameter, where the weights may be adapted to cause the training distribution to conform to the test distribution at a degree of conformance, and where the degree of conformance may be based on the weight importance parameter." At block S12, weights may be calculated. In an example, weights may be calculated using equation (1), discussed above. Weights may be calculated based on the differences and based on the weight importance parameter. The weights may be adapted to cause the training distribution to conform to the test distribution at a degree of conformance. The degree of conformance may be based on the weight importance parameter. In some examples, calculating the weights and determining the degree of conformance may be further based on a second weight importance parameter. A function may be generated based on the training data and the weights. For example, weighted function may be generated by machine learning module based on training data and weights. The test data may be applied to the function as an input. For example, test data may be applied to weighted function as an input. Labels may be generated, in response to the application of the test data to the function. In some examples, outputs or labels may be generated, in response to application of inputs to weighted function. In various examples, the labels may include at least one of recommendations, classifications, predictions, and/or determinations.

Figure 4:
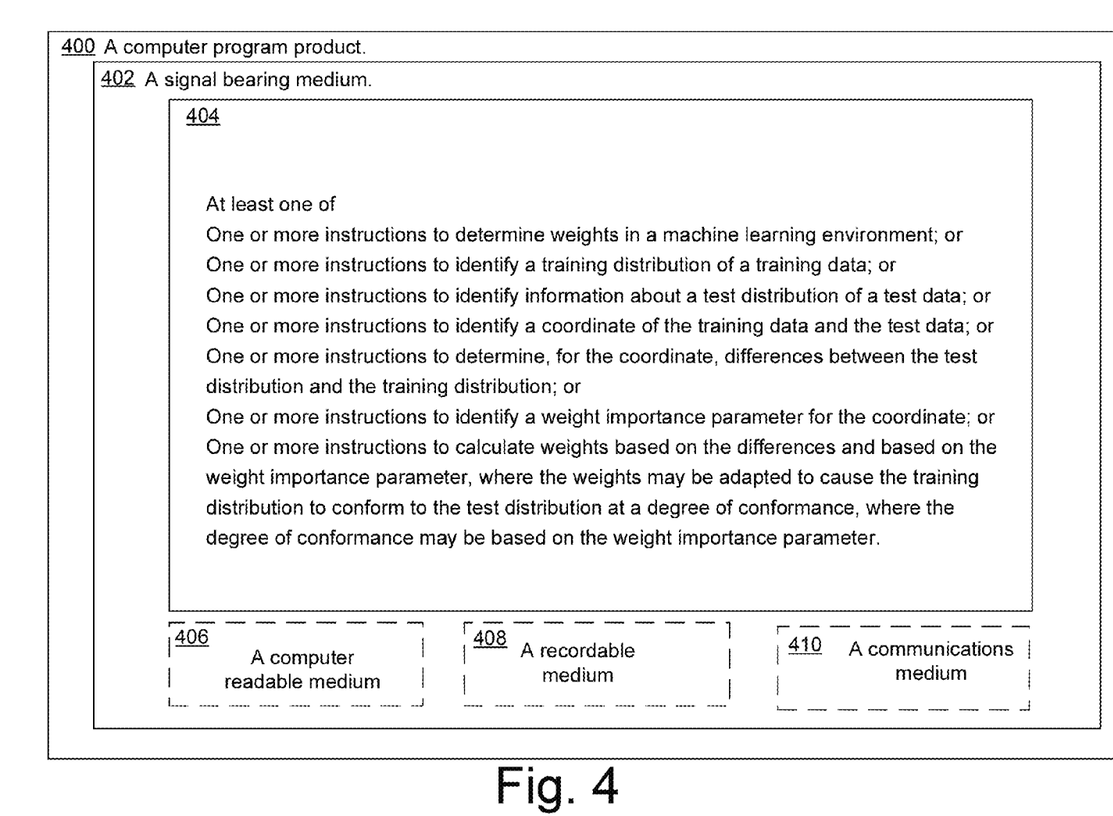
FIG. 4 illustrates an example computer program product that can be utilized to implement weight generation in machine learning.

FIG. 4 illustrates an example computer program product 400 that can be utilized to implement weight generation in machine learning, arranged in accordance with at least some embodiments described herein. Computer program product 400 may include a signal bearing medium 402. Signal bearing medium 402 may include one or more instructions 404 that, in response to execution by, for example, a processor, may provide the functionality and features described above with respect to FIGS. 1-3. Thus, for example, referring to system 100, processing module 104 and/or machine learning module 110 may undertake one or more of the blocks shown in FIG. 4 in response to instructions 404 conveyed to system 100 by signal bearing medium 402. In some examples, instructions 404 may be stored in a memory, such as memory 106.

In some implementations, signal bearing medium 402 may encompass a computer-readable medium 406, such as, but not limited to, a hard disk drive (HDD), a Compact Disc (CD), a Digital Video Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). Thus, for example, computer program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
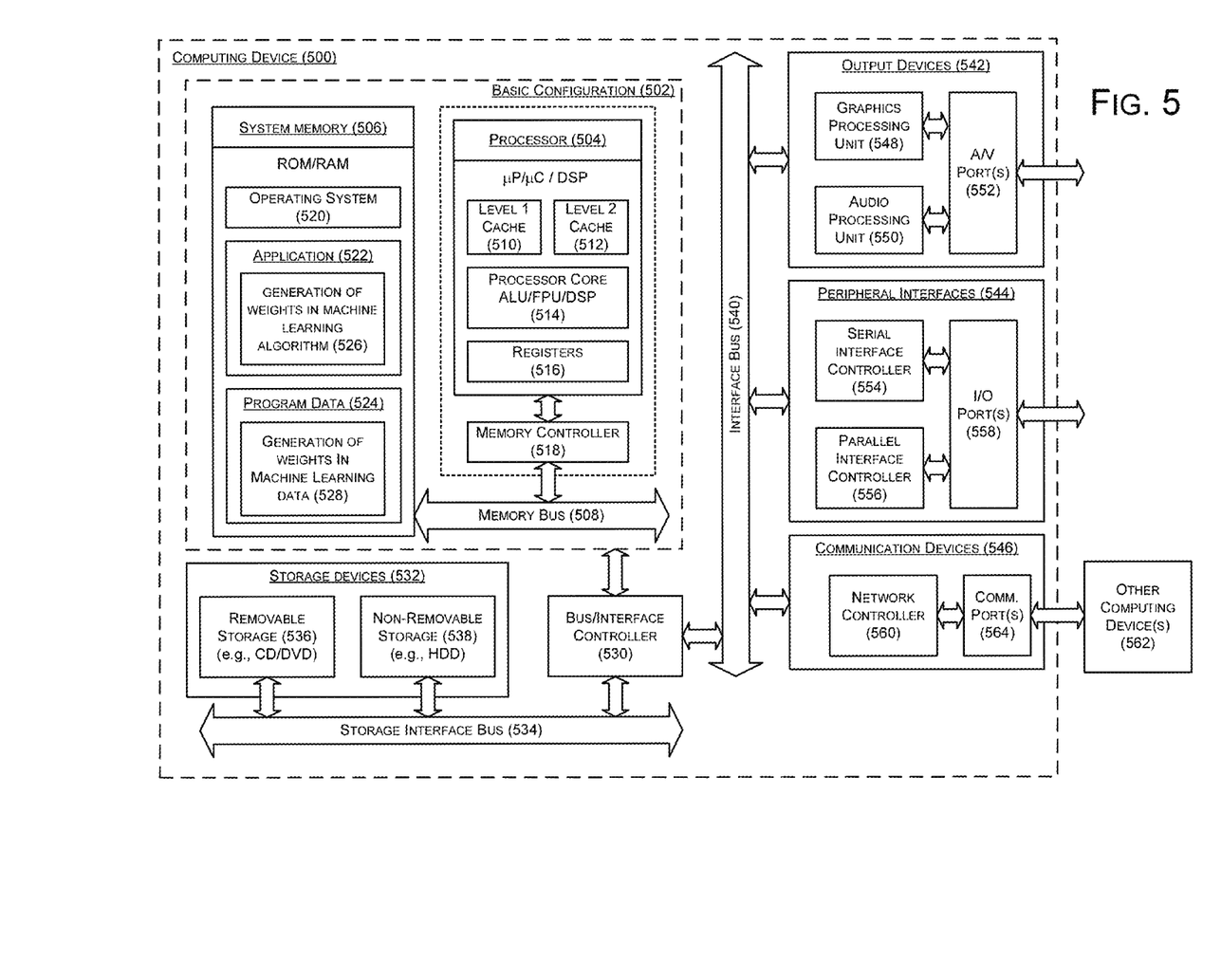
FIG. 5 is a block diagram illustrating an example computing device that is arranged to weight generation in machine learning, all arranged according to at least some embodiments described herein.

FIG. 5 is a block diagram illustrating an example computing device 500 that is arranged to implement weight generation in machine learning, arranged in accordance with at least some embodiments described herein. In a very basic configuration 502, computing device 500 typically includes one or more processors 504 (such as, for example, processing module 104) and a system memory 506 (such as, for example, memory 106). A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof. Processor 504 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with processor 504, or in some implementations, memory controller 518 may be an internal part of processor 504.

Depending on the desired configuration, system memory 506 may be of any Type including but not limited to volatile memory (such as RAM), non-volatile memory (such as ROM, flash memory, etc.) or any combination thereof. System memory 506 may include an operating system 520, one or more applications 522, and program data 524. Application 522 may include a generation of weights in machine learning algorithm 526 that is arranged to perform the functions and operations as described herein including those described with respect to FIGS. 1-4 in connection with system 100. Program data 524 may include generation of weights in machine learning data 528 that may be useful to implement generation of weights in machine learning as is described herein. In some embodiments, application 522 may be arranged to operate in cooperation with program data 524 and/or operating system 520 such that weight generation in machine learning may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDDs), optical disk drives such as compact disc (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 Cells refers to groups having 1, 2, or 3 Cells. Similarly, a group having 1-5 Cells refers to groups having 1, 2, 3, 4, or 5 Cells, and so forth. While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to implement weights in a machine learning system, the method comprising:
   receiving, by a weight generation module of a device of the machine learning system, training data, wherein the training data includes a first set of points;
   identifying, by the weight generation module of the device, a training distribution of the training data;
   receiving, by the weight generation module of the device, test data, wherein the test data includes a second set of points;

identifying, by the weight generation module of the device, information about a test distribution of the test data;

identifying, by the weight generation module of the device, one or more coordinates shared by the first set of points included in the training data and the second set of points included in the test data;

determining, by the weight generation module of the device, differences between the test distribution and the training distribution for a coordinate of the one or more coordinates;

identifying, by a processor of the device, a weight importance parameter;

calculating, by the weight generation module of the device, weights for the first set of points included in the training data based on the determined differences between the test distribution and the training distribution, and based on the weight importance parameter, wherein the weights are adapted to cause the training distribution to conform to the test distribution at a degree of conformance, and wherein the degree of conformance is based on the weight importance parameter;

transmitting, by the weight generation module of the device, the weights to a machine learning module of the device;

adjusting, by the machine learning module of the device, the weight importance parameter to control the degree of conformance, wherein the degree of conformance includes a degree to which the weights are adapted to conform the test distribution to the training distribution to improve a predictive capability of the machine learning system; and operating the machine learning system with the improved predictive capability.

2. The method of claim 1, wherein the coordinate includes a first coordinate, the weight importance parameter includes a first weight importance parameter, and the method further comprises:

identifying, by the weight generation module of the device, a second coordinate of the one or more coordinates;

determining, by the weight generation module of the device, differences between the test distribution and the training distribution for the second coordinate; and identifying, by the processor of the device, a second weight importance parameter for the second coordinate, wherein the second weight importance parameter is different from the first weight importance parameter, wherein calculating the weights is further based on the second weight importance parameter, and wherein the degree of conformance is further based on the second weight importance parameter.

3. The method of claim 1, wherein operating the machine learning system includes:

generating a function based on the training data and the weights;

applying the test data to the function as an input; and generating labels, in response to the application of the test data to the function.

4. The method of claim 3, wherein generating the labels includes generating labels that include at least one of recommendations, classifications, predictions, and determinations.

5. The method of claim 1, wherein:

receiving the training data includes receiving training data that is generated at a first instance of time, and receiving the test data includes receiving test data that is generated at a second instance of time, wherein the second instance of time is later than the first instance of time.

6. The method of claim 1, wherein calculating the weights comprises:

iteratively determining differences between the training data and the test data, and wherein the weights are calculated based on a convergent value of the differences between the training data and the test data.

7. The method of claim 1, wherein receiving the training data includes receiving training data that includes a number of points, wherein the coordinate includes a range of values in a coordinate space, and wherein the method further comprises:

dividing the range of values in the coordinate space into bins, wherein calculating the weights is based on the number of points in the training data and a number of the bins.

8. The method of claim 1, wherein the coordinate includes a range of values in a coordinate space, and wherein the method further comprises:

dividing the range of values in the coordinate space into bins, wherein calculating the weights is based on a number of the first and second sets of points which are located in the bins.

9. A method to implement weights in a machine learning system, the method comprising:

receiving, by a weight generation module of a device of the machine learning system, training data, wherein the training data includes a first set of points;

identifying, by the weight generation module of the device, a training distribution of the training data;

receiving, by the weight generation module of the device, test data, wherein the test data includes a second set of points;

identifying, by the weight generation module of the device, information about a test distribution of the test data;

identifying, by the weight generation module of the device, one or more coordinates shared by the first set of points included in the training data and the second set of points included in the test data;

determining, by the weight generation module of the device, differences between the test distribution and the training distribution for a coordinate of the one or more coordinates;

identifying, by a processor of the device, a first weight importance parameter;

calculating, by the weight generation module of the device, first weights for the first set of points included in the training data based on the determined differences between the test distribution and the training distribution, and based on the first weight importance parameter, wherein the first weights are adapted to cause the training distribution to conform to the test distribution at a first degree of conformance, and wherein the first degree of conformance is based on the first weight importance parameter;

adjusting, by a machine learning module of the device, the first weight importance parameter to control the first degree of conformance, wherein the first degree of conformance includes a degree to which the first weights are matched to the training data and the test data, so as to facilitate simplified match of the test and training distributions to improve a predictive capability of the machine learning system;

identifying, by the processor of the device, a second weight importance parameter;

calculating, by the weight generation module of the device, second weights for the first set of points included in the training data based on the determined differences between the test distribution and the training distribution, and based on the second weight importance parameter, wherein the second weights are adapted to cause the training distribution to conform to the test distribution at a second degree of conformance, and wherein the second degree of conformance is based on the second weight importance parameter;

adjusting, by the machine learning module of the device, the second weight importance parameter to control the second degree of conformance, wherein the second degree of conformance includes a degree to which the second weights are matched to the training data and the test data, so as to facilitate simplified match of the test and training distributions to improve the predictive capability of the machine learning system; and operating the machine learning system with the improved predictive capability.

10. The method of claim 9, wherein the coordinate is includes a first coordinate, and wherein the method further comprises:

identifying, by the weight generation module of the device, a second coordinate of the one or more coordinates; and identifying, by the processor of the device, a third weight importance parameter for the second coordinate, wherein the third weight importance parameter is different from the first and second weight importance parameters, wherein calculating the first weights and the second weights is further based, at least in part, on the third weight importance parameter.

11. The method of claim 9, wherein operating the machine learning system includes:

generating a function based on the training data and the first and second weights;

applying the test data to the function as an input; and generating labels, in response to the application of the test data to the function.

12. The method of claim 11, wherein generating the labels includes generating labels that include at least one of recommendations, classifications, predictions, and determinations.

13. The method of claim 9, wherein:

receiving the training data includes receiving training data that is generated at a first instance of time; and receiving the test data includes receiving test data that is generated at a second instance of time, wherein the second instance of time is later than the first instance of time.

14. The method of claim 9, wherein calculating the first weights and the second weights comprises:

iteratively determining differences between the training data and the test data, wherein the first weights and the second weights are calculated based on a convergent value of the differences between the training data and the test data.

15. The method of claim 9, wherein receiving the training data includes receiving training data that includes a number of points, wherein the coordinate includes a range of values in a coordinate space, and wherein the method further comprises:

dividing the range of values in the coordinate space into bins, wherein calculating the first and second weights is based on the number of points in the training data and a number of the bins.

16. A machine learning system, comprising:

a processor; and a memory configured to be in communication with the processor, wherein the memory includes:

training data, wherein the training data comprises first points; and test data, wherein the test data comprises second points, wherein the processor is effective to:

identify a coordinate of the first and second points, wherein the coordinate includes a range of values in a coordinate space;

divide the range of values in the coordinate space into bins, wherein respective bins define subsets of the range of values;

determine a first frequency, wherein the first frequency relates to a first percentage of the first points that are located within a particular bin;

determine a second frequency, wherein the second frequency relates to a second percentage of the second points that are located within the particular bin;

identify a weight importance parameter for the coordinate;

compare the first frequency and the second frequency;

calculate a weight for the training data, based at least in part on the comparison of the first and second frequencies, and based on the weight importance parameter, wherein the weight is adapted to cause the training data to conform to the test data at a degree of conformance, wherein the degree of conformance is based on the weight importance parameter; and adjust the weight importance parameter to control the degree of conformance, wherein the degree of conformance includes a degree to which the weight is matched to the training data and the test data, so as to facilitate simplified match of a test distribution and training distribution to improve a predictive capability of the machine learning system, and wherein the memory is further effective to store the weight.

17. The machine learning system of claim 16, wherein:

the first points follow the training distribution, the second points follow the test distribution, and the weight is effective to conform a particular point in the training distribution to a particular point in the test distribution, in accordance with the degree of conformance.

18. The machine learning system of claim 16, wherein to compare the first and second frequencies, the processor is effective to:

identify a first comparison value;

compare frequency values, of the test data and the training data in respective bins and coordinates, to produce a difference value;

update the first comparison value to produce a second comparison value based on the difference value;

iteratively repeat the identification of the first comparison value, the comparison of the frequency values, and the update of the first comparison value, until the second comparison value converges; and store a convergent frequency value in the memory.

19. The machine learning system of claim 16, further comprising a machine learning module, wherein the processor is further effective to:

send the weight and the training data to the machine learning module, and wherein in the machine learning module is effective to:

receive the weight and the training data from the processor;

generate a function based at least in part on the weight and the training data; and store the function in the memory.

20. The machine learning system of claim 16, wherein the processor is effective to calculate the weight based on a number of the first and second points which are located in the bins.

\* \* \* \* \*